March 11, 1952  G. B. SAYRE  2,588,662
AUTOMATIC CONTROL FOR MOLDING PRESSES
Filed May 14, 1947  2 SHEETS—SHEET 1

INVENTOR
GORDON B. SAYRE
BY
ATTORNEY

March 11, 1952  G. B. SAYRE  2,588,662
AUTOMATIC CONTROL FOR MOLDING PRESSES
Filed May 14, 1947  2 SHEETS—SHEET 2

INVENTOR
GORDON B. SAYRE
BY *James and Franklin*
ATTORNEY

Patented Mar. 11, 1952

2,588,662

UNITED STATES PATENT OFFICE 2,588,662

AUTOMATIC CONTROL FOR MOLDING PRESSES

Gordon B. Sayre, Boonton, N. J., assignor to Boonton Molding Company, Boonton, N. J., a corporation of New Jersey Application May 14, 1947, Serial No. 748,063

19 Claims. (Cl. 18—16)

This invention relates to presses, especially for the molding of thermosetting plastics by compression molding, and more particularly to automatic control of the same.

Heretofore presses of the specified character have been controlled manually for the most part. The oldest manual control employed three separate valves, a low pressure valve, a high pressure valve, and an exhaust valve. The operator would either watch a clock to time the operation of the press, or in some cases estimate the curing time. This manual system has been improved by the use of an air-operated three-way valve for controlling the hydraulic valves, there usually being a so-called automatic high valve to turn on the high pressure water in response to the low pressure water when the press has been closed, and comes to a stop. A still further and more recent development for manual control is the use of an electric circuit controlled by a switch, the said circuit driving a solenoid-operated air valve for controlling the air-operated three-way valve previously mentioned.

Automatic control systems have also been applied to presses of the type here considered, but so far as I am aware, these have all been of the so-called cycle shaft or program type, that is, they usually have a main cycle shaft, which is slowly rotated under motor drive at a predetermined speed, the said shaft turning one complete revolution for one program or molding cycle. The shaft is provided with cams and switches, etc., to suitably control the press. It may be mentioned that the program is not so simple as to merely close and open the press, for instead it is customary to "bump" the press shortly after its initial closing, in order to permit "venting," or "breathing" of the material in the mold.

The primary object of the present invention is to provide fully automatic control for a molding press, without necessitating the use of a cycle shaft of the conventional program type. The resulting system of my invention is far simpler and less expensive than the program type, and in fact may be made for less than one-tenth the cost of the program type.

Ancillary objects are to provide for certain contingencies, such as opening the press at any time, omitting the breathing step when not desired, permitting the press to remain closed for heating the mold at the beginning of a working day, controlling the press for a major operation, such as taking out one mold, and putting another in the press. Another ancillary object is to provide for safety of the operator.

To accomplish the foregoing general objects, and other more specific objects which will hereinafter appear, my invention resides in the automatic press control elements and their relation one to the other, as are hereinafter more particularly described in the following specification. The specification is accompanied by drawings, in which.

Figure 1:
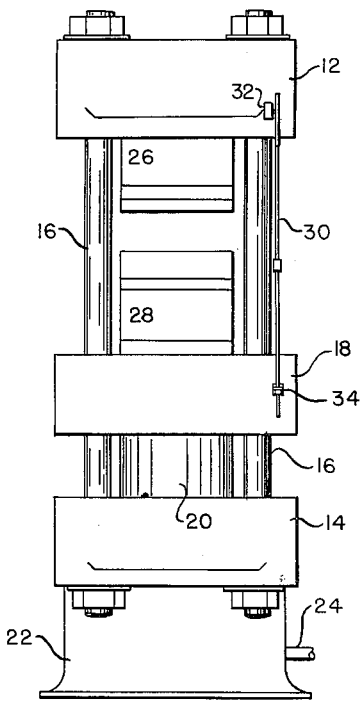
Fig. 1 is an elevation of a press to which the invention may be applied.
Figure 4:
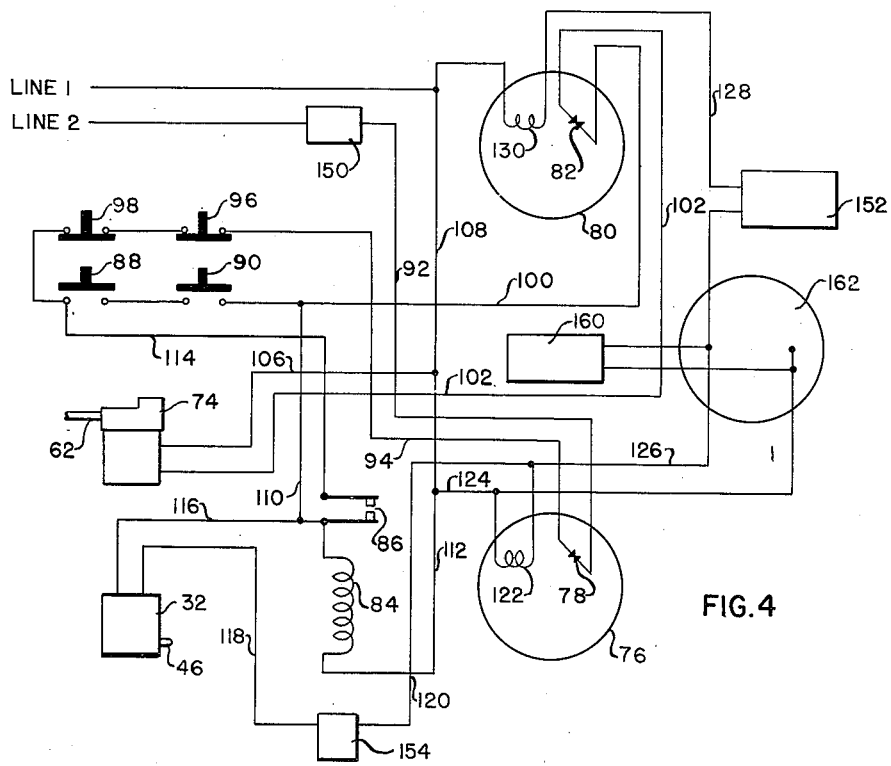
Fig. 4 is a wiring diagram for the electrical part of the apparatus.
Figure 5:
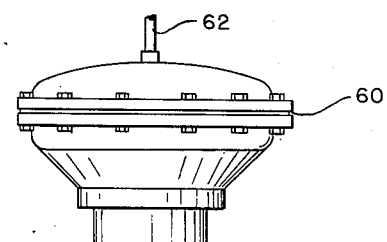
Fig. 5 shows the valve arrangement for use with the invention.

The invention comprises a molding press shown in Fig. 1, controlled by a three-way valve 54 shown in Fig. 5, operated pneumatically by a solenoid-controlled valve 74 shown in Fig. 4. The electrical circuit of Fig. 4 includes a first timing clock 76 for timing the duration of the molding operation or curing time, and a second timing clock 80 for causing a brief opening of the press after a desired period for venting or breathing of the piece being molded. The molding press includes a switch shown at 32 in Figs. 1 and 2, which simultaneously starts operation of both clocks when the press is closed. The breather clock 80 releases the press for a brief interval independently of the timing clock 76, but running out of the timing clock 76 causes the press to open and to remain open, until again closed by depression of suitable starting buttons 88 and 90.

To be more specific, the motors of the clocks are arranged electrically in parallel, so that they are started simultaneously, while the contacts controlled by the clocks are arranged electrically in series, so that opening of either set of contacts will interrupt the supply of current to the valve. The circuit includes a stick relay 84, and the contacts 82 of the breather clock are so arranged in circuit as to affect the air valve 74 without releasing the stick relay 84, whereas the contacts 78 of the timing clock are so arranged in circuit as to open the stick relay. Thus the breather clock will control the press independently of and during operation of the timing clock. The motor of clock 80 is preferably of a type which may be stalled against further rotation without injury, even though the current supply to both motors is maintained in order to continue the operation of the timing clock until the molding time runs out.

Referring to the drawings, and more particularly to Fig. 1, the molding press there shown comprises stationary platens 12 and 14, spaced by appropriate tie rods 16. A movable platen 18 slides on the rods 16, and is carried on a ram 20, slidable in a cylinder 22, which acts also as a base for the press. A single pipe connection 24 to the bottom of cylinder 22 is adequate, for the press will open by gravity alone when the pressure is relieved. A conventional die 26, 28 is mounted in the press, the upper half 26 of the die being carried by the stationary head 12, and the lower half 28 of the die being carried by the movable platen 18.

The press as so far described is conventional. In accordance with the present invention, a lost motion link 30 is added to the press, for the purpose of actuating a suitable electric switch 32, the said switch preferably being of the microtwitch type. The link or rod 30 is slidably received in a small bracket 34, on the movable platen 18 of the press.

Figure 2:
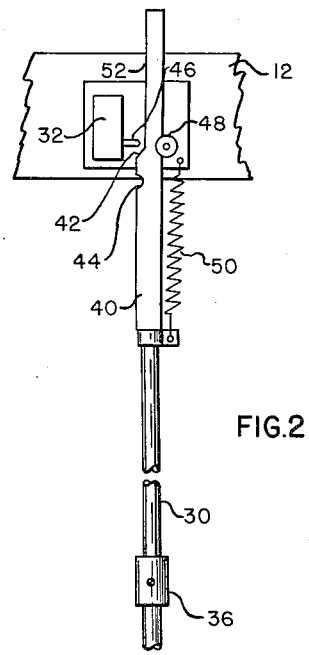
Fig. 2 shows a lost-motion link, which is added to the press as a part of the present invention.

This arrangement is shown in greater detail in Fig. 2, referring to which it will be seen that the rod 30 is provided with collars 36 and 38, on opposite sides of the bracket 34, with a substantial lost motion space therebetween, the said space being nearly equal to the travel of the press required for closing the particular mold then in the press. It will be understood that the collars 36 and 38 are adjustable on rod 30, thus adapting the same for use with different molds. At its upper end the rod 30 carries a bar 40, the said bar having an inclined camming surface at 42, and a detent notch 44, both of these cooperating with the plunger 46 of a normally open micro-switch 32. The bar is guided by suitable bearings exemplified in the present case by a flanged roller 48.

It may be explained at this point that the upper collar 36 is so set as to bring notch 44 to plunger 46 when the press has just closed. The notch 44 is not deep enough to re-open the switch 32, and instead acts merely as a mechanical detent to hold the rod 30 in elevated position when the press reopens slightly for breathing. For this purpose the weight of the rod is nearly wholly counterbalanced by suitable means, here exemplified as a pull spring 50. Of course, the lower collar 38 is so set on rod 30 that when the press opens fully, the bracket 34 engages collar 38 near the end of the press-opening movement, thus moving the bar 40 positively down to the position shown in the drawing, at which time plunger 46 moves outwardly to open the switch 32, the depth of the clearance at 52 on bar 40 being substantially greater than the depth of the detent notch 44. This arrangement is better than letting the rod drop down until collar 36 strikes bracket 34, for it would then be difficult to maintain accurate adjustment of collar 36.

The valve assembly for controlling the press is shown in Fig. 5 of the drawing. Pipe 24 is connected to the press cylinder, and flow of water therethrough is controlled by a three-way valve 54. A pressure line 56, and a waste line 58, are connected to valve 54, and either one may be connected to the press cylinder through pipe 24. The three-way valve 54 is itself operated by air pressure, there being a suitable diaphragm located at 60, subjected to air pressure supplied through an air line 62.

The press is preferably operated by both low and high pressure water. (Water is referred to for convenience, but it will be understood that oil, or other fluid medium, may be employed instead of water.) It is economical to use low pressure water for the main movement of the press, the high pressure water being used solely for the final closing pressure, thus avoiding the waste of substantial quantity of high pressure water each time the press is opened. In the present case, the lower pressure water is supplied to pipe 56 through a supply pipe 64, and the high pressure water is brought to pipe 56 through a pipe 66. The admission of high pressure water to pipe 56 is controlled automatically through a so-called automatic high valve 70. This valve, like the air-operated three-way valve 54, is a known commercially available valve. The automatic high valve 70 is so constructed that it opens and admits high pressure water to pipe 56, in response to the pressure of the low pressure water, but only after the press is closed, and has come to a stop. A conventional check valve 72 is provided in the low pressure line, in order to prevent the flow of high pressure water into the low pressure line.

With this arrangement it will be understood that the operation of the press may be controlled by the supply of air to pipe 62.

Referring now to the wiring diagram of Fig. 4 of the drawing, the flow of air from a suitable source of compressed air, not shown, to the pipe 62, is controlled by means of a solenoid-operated, or magnetically-operated three-way air valve 74. While only pipe 62 is shown, the valve has two additional connections, one to a compressed air tank, and the other to waste or discharge to open air.

Electric power is supplied from a conventional power line outlet to lines 1 and 2, the switching being done in line 2, and line 1 being grounded, if desired. The supply of power to the solenoid-operated valve 74 is timed by means of a suitable time clock 76. The clock-controlled contacts 78 are in the supply circuit, and remain closed until the molding time set on the time clock, say five minutes, runs out. The breather clock is shown at 80, and is provided with a pair of normally closed contacts 82. These are opened momentarily by the clock during the molding operation and while contacts 78 are still closed. The press switch, that is, switch 32 previously referred to in Figs. 1 and 2, is shown at 32 in Fig. 4. There is also a relay 84, having contacts 86, and wired to act as a stick relay.

There are two main starting buttons 88 and 90, the button 88 being a left-hand button located at the left-hand side of the press, and the button 90 being a right-hand button located at the right-hand side of the press. Electrically the arrangement is the same as though a single button were provided, but the two widely spaced buttons are used as a safety measure to make sure that the operator has both hands out of the press. Such a safety arrangement is very simple and inexpensive, compared to the use of mechanical guards or gates.

The operation may be described to greater detail as follows. Figs. 1 and 2 may be assumed to correspond to the open position of the press, the switch 32 being open. Referring now to Fig. 4, when the starting buttons 88 and 90 are both simultaneously pressed, current flows from line 2 through conductor 92, clock contacts 78, wire 94, normally closed stop buttons 96 and 98, starting buttons 88 and 90, wire 100, normally closed breather clock contacts 82, and wire 102, to the solenoid-operated air valve 74. The circuit is completed by wires 106 and 108 leading back to line 1. The energization of valve 74 causes operation of diaphragm 60 (Fig. 5), and consequent shift of the three-way valve 54 to supply low pressure water to pipe 24, and thence to the press cylinder 22 (Fig. 1).

When the platen 18 starts to rise, the spring 50 (Fig. 2) lifts cam bar 40 into contact with the plunger 46, on switch 32. However, spring 50 is not strong enough to depress the switch plunger. As the press continues to close, the bracket 34, through which the rod 30 extends, finally reaches the collar 36, and just as the press completely closes the mold, the cam bar 40 is raised, thus depressing the switch plunger 46, and permitting the plunger to enter the depression 44. At this time the switch 32 remains in closed position, for the detent notch 44 is not deep enough to permit opening of switch 32. In fact, the only purpose of detent notch 44 is to hold the cam bar 40 and rod 30 in their upper position when bracket 34, on platen 18, is lowered slightly during the breathing operation, and at the end of the molding cycle.

Reverting now to Fig. 4, it is not necessary for the operator to hold the starting buttons 88 and 90 closed more than an instant, because of the provision of stick relay 84, 86. When the starting buttons 88 and 90 are pressed, current from line 2 flows from button 90 through conductor 110 and relay coil 84, to conductor 112, conductor 108, and thence back to line 1. This energization of the relay causes closing of the relay contacts 86, whereupon line 2 current will flow from normally closed stop button 98 through conductor 114, and through the closed contacts 86 to the relay coil 84, and thence through conductors 112 and 108, back to line 1, so that the relay sticks in closed position. When relay contacts 86 are closed, the line 2 current is supplied from contacts 86 through conductor 110 and conductor 100, to the breather clock contacts 82. The circuit then continues as previously described, that is, through wire 102, solenoid-operated air valve 74, wire 106, wire 108, and thence back to line 1. Thus the press continues closing once the starting button 88 and 90 have been pressed momentarily.

When the press reaches its closed position, the press switch 32 is closed, and this starts the motors of the timing clocks 76 and 80. Specifically, line 2 current flows from relay contacts 86 through conductor 116, press switch 32, wire 118, and wire 120, to clock motor 122. The circuit is completed through wire 124 and wire 108 back to line 1, and at the same time current flows through wire 126 and wire 128, to clock motor 130, and thence back to line 1. Thus the clocks begin their timing operation upon closing of the press, as they should, so that the curing time is independent of the time required for the press to close.

Figure 3:
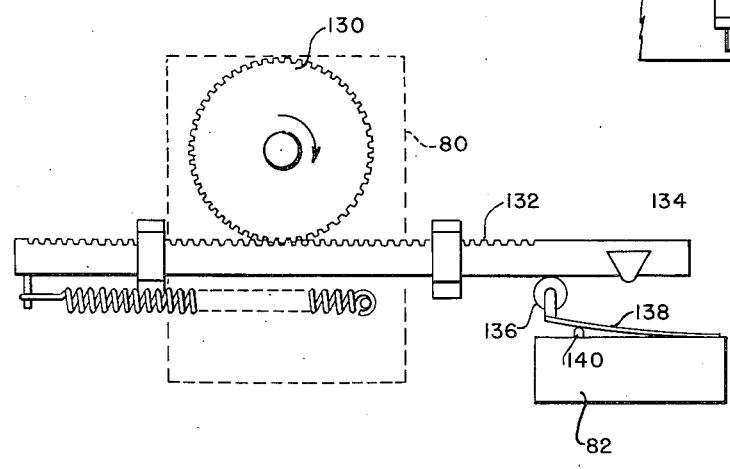
Fig. 3 is a schematic view explanatory of the auxiliary timing clock for breathing.

After a suitable time, say ten or fifteen seconds, the contacts 82 of the breather clock 80 open for a brief interval, say two seconds. This is preferably accomplished by a mechanism such as that shown in Fig. 3 of the drawing. Here the clock 80, through suitable reduction gearing, turns a gear 130 at very slow speed, say one revolution, in fifteen seconds (although the motor of the clock may itself rotate at high speed, say 240 revolutions per minute). The gear 130 meshes with a rack 132, carrying a cam 134. This cooperates with a cam roller 136 on arm 138, bearing against the plunger 140 of a switch containing the contacts 82 previously referred to. It will be evident from inspection of Fig. 3 that as gear 130 rotates, it moves the rack 132 toward the left, until finally the cam 134 depresses the cam follower 136 momentarily. The cam may be so dimensioned as to open the switch 82 for a breathing period of say two seconds, and the cam is preferably so located on the rack bar 132 as to cause this breathing operation to take place, after an interval of say ten or fifteen seconds, following the initial closing of the press.

Reverting to Fig. 4, when the contacts 82 of breather clock 80 are momentarily opened, the circuit to the solenoid-operated air valve 74 is broken, and the three-way valve 54 (Fig. 5) is momentarily shifted, thus causing a slight opening with immediate reclosing of the press. This provides the desired bumping, or venting period, for the mold. The prompt reclosing of contacts 82 re-establishes the circuit of solenoid-operated air valve 74, and the press, when closed, this time remains closed until the main timing clock 76 runs out.

It will be understood that when the press remains closed, it is subjected to the increased pressure resulting from operation of the automatic high valve 70 (Fig. 5).

When the main timing clock 76 runs out, the contacts 78 open, thus interrupting the supply of solenoid-operated air valve 74 with consequent shifting of the position of the three-way valve 54 (Fig. 5), thus cutting off the supply of pressure water, and instead, connecting the cylinder of the press to the waste line 58. The press thereupon opens.

When the platen 18 (Fig. 1) nearly reaches its lowermost position, the bracket 34 reaches the collar 38, thus pulling the rod 30 and the cam bar 40 downwardly. At this time, the detent notch 44 is, of course, ineffective to hold the cam bar and the bracket 34 pulls the cam bar to the initial position shown in Fig. 2 of the drawing, thus permitting the contacts of switch 32 to return to their normally open position. At this time the spring 50 supports the rod 30 and bar 40 from falling to a position lower than that shown. This prevents the rod 30 from dropping down until the collar 36 rests against the bracket 34. If the rod were allowed to drop all the way down each time, it would be very difficult to maintain the adjustment of the collar 36, for the repeated hammer action would gradually cause sliding of the collar 36 along the bar 30.

Reverting to Fig. 4, the stop buttons 96 and 98 are located at the right and left-hand sides of the press for ready accessibility. It will be noted that depression of either stop button will open the main circuit from line 2, thereby de-energizing the supply of current to the solenoid-operated valve 74, and so opening the press. There is a main line switch 150, which may be opened to de-energize the whole system. This may be done when making a major change, such as taking out one mold, and putting another mold in the press. There is a switch 152 connected in series between wires 126 and 128, which lead to the breather clock motor 130. By opening the normally closed switch 152, the motor 130 of breather clock 80 is de-energized, thus making the breather circuit inoperative. This may be done on occasion when molding a product which does not require breathing. Switch 154 is connected in series with wires 118 and 120, leading to the motor 122 of timing clock 76. By opening the normally closed switch 154, the timing clock is made inoperative. This is done when it is desired to close the press, and to keep it closed indefinitely. This is useful for heating the mold before beginning molding operations. The mold may be heated for hours after a week-end shut-down, and is preferably heated with the mold closed. The press is then operated three shifts a day, but is kept closed and heated during each lunch shut-down. By opening the switch 154 the supply of current to the clock motors is interrupted, and consequently when the starting buttons are pushed, the press will close and remain closed indefinitely, there being no clock action to open it at the end of a specified molding time. The press is then opened under manual control, as for example, by pressing either of the stop buttons 96 and 98.

In connection with the operation of the clocks 76 and 80, it should be understood that when the breather contacts 82 open, the circuit to the three-way air valve 74 is opened, but the circuit to the relay coil 84 is not opened. Consequently, the relay remains closed, and when the breather contacts 82 again close, the supply circuit to the air valve 74 is re-established. In this way the contacts 82 and the press may be opened momentarily, and promptly closed again.

When, however, the contacts 78 of the timing clock 76 open, the entire supply of current from line 2 is interrupted, and consequently the relay 84 is deenergized, and the relay contacts 86 are opened. For this reason closing of contacts 78 will not re-establish the circuit once they have been opened. This is of importance, for the contacts 78 are closed when the clock 76 is automatically re-set. Specifically, when the press reaches its fully open position, the press switch 32 returns to its normal or open position. This interrupts the current supply to the motors of the two clocks, whereupon the clocks are automatically re-set, and their contacts are closed as a part of the re-setting operation. This does not, however, affect the relay 84, or the air valve 74, and the press remains open until the start buttons 88 and 90 are simultaneously pressed to initiate closing of the press.

The unit 160 is not an essential part of the invention, it being simply a counter which counts the number of cycles or operations of the mold. This, in turn, is a measure of the number of pieces that have been molded. The unit 162 is a time totalizer. This too is not essential to the invention, it being useful for payroll purposes, the operator being paid on a wage scale which involves knowledge of the time during which a press is closed.

It is believed that the construction and method of operation of my improved press control circuit, as well as the advantages thereof, will be apparent from the foregoing detailed description. When the operator presses the two spaced starting buttons 88 and 90 simultaneously, he closes stick relay 84, and starts closing of the press. When the press is closed, the press switch 32 starts both clocks. As the breather clock runs, its gear and rack arrangement causes a cam to open its contacts for a short interval, during which the valve 74 is de-energized to open the press momentarily. At this time the stick relay 84 is not opened, but later when the main timing clock 76 runs out, it opens the relay circuit, with consequent opening of the press. When the press is opened the press switch 32 causes re-setting of the clocks preparatory to the next molding operation.

The valves referred to in the above description are commercially made by and may be purchased from Seely Instrument Company, Inc. of Niagara Falls, New York, or Sinclair Collins Company of Akron, Ohio, and others.

It will be apparent that while I have shown and described the invention in a preferred form, changes may be made without departing from the spirit of the invention, as sought to be defined in the following claims.

I claim:

1. Automatic press control mechanism comprising a main valve and an electrical circuit including a timing clock and a breather clock for controlling the operation of said press, a cam moved by said breather clock, a switch operated by said cam to momentarily "bump" the press after a desired initial curing interval determined by said breather clock, said clocks operating independently but having contacts so arranged in a common circuit that the breather clock will control the main valve independently of and during operation of the timing clock.

2. Automatic press control mechanism comprising a three-way hydraulic valve for controlling the press cylinder, an electrical circuit including a timing clock and a breather clock for controlling the operation of said valve, a cam moved by said breather clock, a switch operated by said cam to momentarily "bump" the press after a desired initial curing interval determined by said breather clock, said clocks operating independently but having contacts so arranged in a common circuit that the breather clock will control the main valve independently of and during operation of the timing clock.

3. Automatic press control mechanism comprising a main three-way hydraulic valve for controlling the press cylinder, an automatic high pressure valve and a high pressure supply line connected to said main valve, a check valve and a low pressure supply line connected to said main valve, an electrical circuit including a timing clock and a breather clock for controlling the operation of said main valve, a cam moved by said breather clock, a switch operated by said cam to momentarily "bump" the press after a desired initial curing interval determined by said breather clock, said clocks operating independently but having contacts so arranged in a common circuit that the breather clock will control the main valve independently of and during operation of the timing clock.

4. Automatic press control mechanism comprising a main air-operated three-way hydraulic valve for controlling the press cylinder, an automatic high pressure valve and a high pressure supply line connected to said main valve, a check valve and a low pressure supply line connected to said main valve, a solenoid-operated three-way air valve for controlling the aforesaid main valve, an electrical circuit including a timing clock and a breather clock for controlling the operation of said solenoid-operated valve, a cam moved by said breather clock, a switch operated by said cam to momentarily "bump" the press after a desired initial curing interval determined by said breather clock, said clocks operating independently but having contacts so arranged in a common circuit that the breather clock will control the main valve independently of and during operation of the timing clock.

5. In an automatic press control system for the compression-molding of thermosetting plastics, a normally de-energized but intermittently operated breather timing clock comprising a constant speed electric clock motor, switch means controlling the operation of said motor, switch closing means independent of time but responsive to actual physical closing of the press in order to then energize the clock motor, a cam moved by said clock motor, a cam follower, a breather switch operated by said cam follower for causing breathing of the press when acted on by said cam, whereby the time of beginning of breathing is determined by the timing clock after actual physical closing of the press, said cam being so shaped and dimensioned as to operate on the breather switch for only a few seconds in order to permit breathing of the press for said few seconds.

6. In an automatic press control system for the compression-molding of thermosetting plastics, a normally de-energized but intermittently operated breather timing clock comprising a constant speed electric clock motor, switch means controlling the operation of said motor, switch closing means independent of the time but responsive to actual physical closing of the press to energize the clock motor, whereby the circuit of said motor remains energized throughout the molding period while the press is closed, a cam mounted for limited movement, said cam being moved by said clock motor, a cam follower, a switch operated by said cam follower for causing breathing of the press when acted on by said cam, whereby the time of beginning of the breathing is determined by the timing clock after closing of the press, said cam being so shaped and dimensioned as to operate on the switch for only a few seconds in order to permit breathing of the press for said few seconds, the limited permitted movement of the cam causing stalling of the clock motor thereafter during the substantial molding period while the press is closed, and the clock motor being of a type which may be stalled against further rotation for an unlimited time period without injury to the motor, even though the current supply circuit to the motor is left closed.

7. Automatic control mechanism for controlling the operation of a press, said apparatus comprising a main timing clock, a breather clock, a switch responsive to completion of closing of the press for starting the operation of the clocks, contacts operated by timing out of the timing clock, contacts operated only momentarily by timing out of the breather clock, said contacts being so connected in a common circuit that operation of either contacts causes opening of the press.

8. Automatic control mechanism for controlling the operation of a press, said apparatus comprising a motor driven main timing clock, a motor driven breather clock, the motors of said clocks being arranged in parallel, a switch responsive to closing of the press for starting the operation of the clocks, contacts operated by timing out of the timing clock, contacts operated only momentarily by timing out of said breather clock, said timing contacts and breather contacts being connected in series.

9. Automatic control mechanism for controlling the operation of a press for molding thermosetting plastics by compression-molding, said apparatus comprising a motor driven main timing clock, a motor driven breather clock, the motors of said clocks being arranged in parallel, a switch responsive to closing of the press for starting the operation of the clocks, normally open contacts closed during operation of the main timing clock, normally closed contacts associated with said breather clock, means whereby the latter contacts are momentarily opened for breathing after lapse of a desired interval of time, said timing contacts and breather contacts being connected in series, whereby opening of either contacts causes opening of the press.

10. In an automatic control system for a molding press having stationary and movable heads, a conventional plunger-operated switch positioned with its plunger approximately horizontal, a vertically movable cam bar cooperating with said plunger, a rod forming an extension of said cam bar and extending between the stationary and movable heads of the press, a slidable lost motion connection between said rod and one of said heads, and a detent notch on said cam bar for engaging the switch plunger and thereby holding the cam bar in elevated position.

11. In an automatic control system for a molding press having stationary and movable heads, a conventional plunger-operated switch positioned with its plunger approximately horizontal, a vertically movable cam bar cooperating with said plunger, a rod forming an extension of said cam bar and extending between the stationary and movable heads of the press, a bracket on one of said heads slidably receiving the rod, spaced collars at opposite sides of the bracket adjustably locked in position on the rod in order to move the cam bar near the end of the closing movement or opening movement of the press, and a detent notch on said cam bar for engaging the switch plunger and thereby holding the cam bar in elevated position.

12. In an automatic control system for a molding press having stationary and movable heads, a conventional plunger-operated switch positioned with its plunger approximately horizontal, a vertically movable cam bar cooperating with said plunger, a rod forming an extension of said cam bar and extending between the stationary and movable heads of the press, a slidable lost motion connection between said rod and one of said heads, and counterbalance means for supporting the rod and cam bar in raised position, said means having insufficient force to itself raise the rod and cam bar.

13. In an automatic control system for a molding press having stationary and movable heads, a conventional plunger-operated switch positioned with its plunger approximately horizontal, a vertically movable cam bar cooperating with said plunger, a rod forming an extension of said cam bar and extending between the stationary and movable heads of the press, a bracket on one of said heads slidably receiving the rod, spaced collars at opposite sides of the bracket adjustably locked in position on the rod in order to move the cam bar near the end of the closing movement or opening movement of the press, and a counterbalance means for supporting the rod and cam bar in raised position, said means having insufficient force to itself raise the rod and cam bar.

14. In an automatic control system for a molding press having stationary and movable heads, a conventional plunger-operated switch positioned with its plunger approximately horizontal, a vertically movable cam bar cooperating with said plunger, a rod forming an extension of said cam bar and extending between the stationary and movable heads of the press, a bracket on one of said heads slidably receiving the rod, spaced collars at opposite sides of the bracket adjustably locked in position on the rod in order to move the cam bar near the end of the closing movement or opening movement of the press, a spring counterbalance means for supporting the rod and cam bar in raised position, and a detent notch on said cam bar for engaging the switch plunger and thereby holding the cam bar in elevated position without changing the condition of the switch.

15. In an automatic press control system for the compression-molding of thermosetting plastics, a first and second normally de-energized but intermittently operated constant speed electric motor driven timing clocks, the first clock serving to time the duration of a molding operation, the second clock serving to cause breathing during the molding operation, switch means for simultaneously energizing or de-energizing both of said motors, switch closing means independent of time and responsive to actual physical closing of the press to energize the clock motors, whereby the circuit of said motors remains energized throughout the molding period while the press is closed, a cam mounted for limited movement, said cam being moved by said second clock motor, a cam follower, a switch operated by said cam follower for causing breathing of the press when acted on by said cam whereby the time of beginning of the breathing is determined by the second timing clock, said cam being so shaped and dimensioned as to operate on the switch for only a few seconds in order to permit breathing of the press for said few seconds, the limited permitted movement of the cam causing stalling of the clock motor thereafter during the substantial molding period while the first clock continues operation, and the clock motor being of a type which may be stalled against further rotation for an unlimited time period without injury to the motor, even though the current supply circuit to the motor is left closed.

16. Automatic press control mechanism comprising a three-way hydraulic valve for controlling a press cylinder, an electrical circuit for controlling said valve, said circuit including a locking relay, a motor driven timing clock and a motor driven breather clock, switch means responsive to completion of closing of the press for simultaneously starting the operation of both clocks, said clocks having contacts so arranged in the aforesaid valve circuit that the breather clock will release the press for a brief interval during the molding cycle independently of the timing clock, and running out of the molding cycle time on the timing clock will cause its contacts to open the press.

17. Press control apparatus as defined in claim 16, in which the contacts of the timing clock are arranged in series with the locking relay and in which the contacts of the breather clock are not arranged in series with the relay.

18. Press control apparatus as defined in claim 16, in which the contacts of the timing clock are arranged in series with the locking relay so that the relay is released when the contacts open, whereupon the relay remains open even after the contacts are re-closed when the clock is re-set, and in which the contacts of the breather clock are not arranged in series with the relay, although so arranged in the valve control circuit that opening of the contacts of the breather clock moves the valve to open the press, but re-closing of the contacts of the breather clock restores the valve to again close the press.

19. Automatic press control mechanism comprising a three-way hydraulic valve for controlling a press cylinder, an electrical circuit for controlling said valve, said circuit including a locking relay, a timing clock and a breather clock, switch means responsive to completion of closing of the press for simultaneously starting the operation of both clocks, said clocks having contacts so arranged in the aforesaid circuit that the breather clock will shift the valve and release the press for a brief interval during the molding cycle independently of the timing clock, and without releasing the stick relay, while running out of the molding cycle time on the timing clock will cause its contacts to open the aforesaid locking relay circuit, and thereby keep the press open.

GORDON B. SAYRE.

REFERENCES CITED

The following references are of record in the file of this patent:

UNITED STATES PATENTS

| Number | Name | Date |
| --- | --- | --- |
| 1,298,950 | Hill | Apr. 1, 1919 |
| 2,113,115 | MacMillin et al. | Apr. 5, 1938 |
| 2,349,916 | Stacy | May 30, 1944 |
| 2,367,242 | Stacy | Jan. 16, 1945 |
| 2,375,946 | Reichelt | May 15, 1945 |
| 2,392,203 | Tucker | Jan. 1, 1946 |
| 2,394,661 | Brunner | Feb. 12, 1946 |
| 2,434,849 | Hess | Jan. 20, 1948 |